US008281202B2

United States Patent
Tseng

(10) Patent No.: US 8,281,202 B2
(45) Date of Patent: Oct. 2, 2012

(54) METHOD AND APPARATUS FOR IMPROVING TRANSMISSION TIME INTERVAL BUNDLING

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 759 days.

(21) Appl. No.: 12/423,822

(22) Filed: Apr. 15, 2009

(65) Prior Publication Data

US 2009/0259911 A1    Oct. 15, 2009

Related U.S. Application Data

(60) Provisional application No. 61/044,907, filed on Apr. 15, 2008.

(51) Int. Cl.
*G06F 11/00* (2006.01)
(52) U.S. Cl. .......................... 714/748; 714/749
(58) Field of Classification Search ............ 714/748, 714/749, 750, 18–20
See application file for complete search history.

(56) References Cited

U.S. PATENT DOCUMENTS

| 2008/0130492 A1* | 6/2008 | Kuo | 370/226 |
| 2008/0175177 A1* | 7/2008 | Jen | 370/310 |
| 2008/0175196 A1* | 7/2008 | Jen | 370/329 |

FOREIGN PATENT DOCUMENTS

| JP | 62018128 A | 1/1987 |
| JP | 62293832 A | 12/1987 |
| JP | 200049678 A | 2/2000 |
| JP | 2005244575 A | 9/2005 |
| KR | 100660055 B1 | 12/2006 |
| KR | 1020070051304 A | 5/2007 |
| WO | 2007007383 A1 | 1/2007 |

OTHER PUBLICATIONS

Notice of Allowance on corresponding KR Patent Application No. 10-2009-0032729 issued on Feb. 22, 2011.
Ericsson, HARQ operation in case of UL Power Limitation, 3GPP TSG-RAN WG2 #58bis, Tdoc R2-072630, Orlando, USA, Jun. 25-29, 2007.
Ericsson, "HARQ operation in case of UL Power Limitaton" 3GPP TSG-RAN WG2 #60. Jeju Isand, Korea, Nov. 5-9, 2007 (Tdoc R2-074940).
Office Action on corresponding foreign application (JP 2009-099416) from JPO dated Jul. 12, 2011.
Alcatel-Lucent:"RAN2 aspects of the solutions for Subframe Bundling", Mar. 31-Apr. 4, 2008, 3GPP TSG-RAN WG2 #61bis, R2-081446, XP050139195, Shenzhen, China.
Philips,NXP Semiconductors :"UL coverage enhancement for VoIP transmission", Feb. 11-15, 2008, 3GPP TSG RAN WG2 Meeting #61,Tdoc R2-081185, XP050138958,Sorrento,Italy.

(Continued)

*Primary Examiner* — Dieu-Minh Le
(74) *Attorney, Agent, or Firm* — Blue Capital Law Firm, P.C.

(57) ABSTRACT

A method for improving transmission time interval bundling transmission in a wireless communication system includes transmitting a first bundle at a first time point, and transmitting a second bundle at a second time point behind the first time point, wherein the second time point is located in a bundle round trip time of the first bundle, and the bundle round trip time is a specific multiple of a Hybrid Automatic Repeat Request Round Trip Time.

16 Claims, 9 Drawing Sheets

OTHER PUBLICATIONS

Motorola:"RV for UL Subframe Bundling", Mar. 31-Apr. 4, 2008, TSG-RAN WG1 #52bis, R1-081304, XP050109735, Shenzhen, China.

3GPP, R2-081722, Mar. 2003.

3GPP, R2-081326, Feb. 2008.

3GPP, R2-081991, Mar. 2008.

Office Action on corresponding foreign application (JP2009-099416) from JPO dated Dec. 20, 2011.

* cited by examiner

METHOD AND APPARATUS FOR IMPROVING TRANSMISSION TIME INTERVAL BUNDLING

CROSS REFERENCE TO RELATED APPLICATIONS

This application claims the benefit of U.S. Provisional Application No. 61/044,907, filed on Apr. 15, 2008 and entitled "UL HARQ operation and status reporting of ARQ layer", the contents of which are incorporated herein by reference.

BACKGROUND OF THE INVENTION

1. Field of the Invention

The present invention relates to a method and apparatus for improving transmission time interval bundling in a wireless communication system, and more particularly, to a method and apparatus for enhancing an efficiency of transmission time interval bundling and preventing from wasting radio resource.

2. Description of the Prior Art

Long Term Evolution wireless communications system (LTE system), an advanced high-speed wireless communications system established upon the 3G mobile telecommunications system, supports only packet-switched transmission, and tends to implement both Medium Access Control (MAC) layer and Radio Link Control (RLC) layer in one single communication site, such as in Node B alone rather than in Node B and RNC (Radio Network Controller) respectively, so that the system structure becomes simple.

In LTE, a technique of transmission time interval (TTI) bundling is introduced for improving uplink coverage according to the prior art. TTI bundling is performed by repeatedly transmitting a same packet with default times, and those repeatedly transmitted packets are named a bundle. UEs in cell boundary utilizing TTI bundling can reduce transmission delay and signaling of control channels for enhancing reliability and accuracy of transmission, to improve LTE uplink coverage.

TTI bundling is performed under the existing system, to repeatedly transmit each packet for a fixed times. Under such circumstances, since a length of TTI and an operation of Hybrid Automatic Repeat Request (HARQ) are unchanged, the prior art has provided different solutions targeting on TTI bundling.

The first solution is: a network end generates an acknowledgement signal according to a decoding result of the last packet of a bundle. Therefore, even if other packets of the bundle are received successfully, the UE has to retransmit the bundle once the last packet is not received successfully. This unnecessary retransmission causes waste of radio resource and affects transmission rate. In addition, a process of bundle retransmission lacks efficiency. For example, please refer to FIG. 1A, which is a schematic diagram of packet transmission and reception of a UE. Assuming that the length of TTI is T, and HARQ_RTT represents HARQ round trip time (RTT) with a fixed length 8T. Packets PI1, PI2, PI3 and PI4 are the same packets transmitted repeatedly for 4 consecutive TTIs from a UE, which means the packets PI1, PI2, PI3 and PI4 form a bundle BDL. When the UE finishes transmitting the bundle BDL at time point 4T, the network end generates an acknowledgement signal (ACK/NACK) according to a decoding result of the last packet P4 of the bundle BDL to indicate the reception status of the bundle BDL. In this case, the packet P4 is not received successfully by the network end, so the network end reports a non-acknowledgement signal NACK. When the UE receives NACK from the network end between time points 7T and 8T, the UE cannot retransmit the bundle BDL at a starting point of the next HARQ_RTT (at time point 8T) since the processing time is too short. As a result, the UE starts to retransmit the bundle BDL after waiting for a HARQ_RTT, namely at time point 16T. Simply speaking, the UE receives the acknowledgement signal from the network end at the fourth TTI after transmitting the bundle BDL, and determines whether the bundle BDL needs to be retransmitted. If the bundle BDL needs to be retransmitted, the UE has to wait for a HARQ_RTT to retransmit the bundle BDL. Under such circumstances, the unused HARQ_RTT, which is from time point 8T to 16T, is not utilized for packet transmission, becomes waste of network resource, and affects transmission efficiency.

The second solution is: a network end generates an acknowledgement signal according to a decoding result of the first packet of a bundle. This solution can improve the problem that the UE retransmits the bundle BDL after waiting for a HARQ_RTT as shown in FIG. 1A. However, this solution can still cause unnecessary retransmission. For example, in FIG. 1B, when the UE finishes transmitting the packet PI at time point 1T, the network end generates an acknowledgement signal (ACK/NACK) merely according to a decoding result of the packet P1 to indicate a reception status of the bundle BDL. If the packet P1 is not received successfully by the network end, the network end will report NACK. When the UE receives NACK from the network end between time points 4T and 5T, the UE can retransmit the bundle BDL at a starting point of the next HARQ_RTT (at time point 8T) since the processing time is enough. Therefore, such solution improves the transmission efficiency of the bundle BDL, and allows the UE to retransmit the bundle BDL without waiting for a HARQ_RTT. However, because the network end determines whether to report NACK only according to the decoding result of the packet P1, unnecessary retransmission may occur if only the packet P1 is not received successfully while the others are received successfully, causing waste of network resource and affecting the transmission rate.

The third solution is similar to the first solution, namely, a network end generates an acknowledgement signal according to a decoding result of the last packet of a bundle, and the difference is that the length of HARQ_RTT is no longer fixed to 8T, but is prolonged to 12T according to a length of the bundle, which is shown in FIG. 1C. When the UE finishes transmitting the bundle BDL at time point 4T, the network end generates an acknowledgement signal (ACK/NACK) according to a decoding result of the last packet P4 of the bundle BDL to indicate the reception status of the bundle BDL. In this case, the packet P4 is not received successfully by the network end, the network end reports NACK. When the UE receives NACK from the network end between time points 7T and 8T, the UE can retransmit the bundle BDL at a starting point of the next HARQ_RTT (at time point 12T) since HARQ_RTT is prolonged to be 12T. In other words, the UE receives the acknowledgement signal from the network end at the fourth TTI after transmitting the bundle BDL, and determines whether the bundle BDL needs to be retransmitted or not. If the bundle BDL needs to be retransmitted, the UE can retransmit the bundle BDL at the next HARQ_RTT (from time point 12T) since HARQ_RTT is prolonged to 12T. However, although this solution improves the shortcomings in FIG. 1A and shortens packet latency, the length of HARQ_RTT is prolonged according to the length of the bundle, causing transmission time to increase. Moreover, different lengths of bundles makes different lengths of HARQ_RTT,

SUMMARY OF THE INVENTION

It is therefore an objective of the present invention to provide a method and apparatus of transmission time interval bundling transmission improvement in a wireless communication system.

The present invention discloses a method for improving transmission time interval bundling transmission in a user equipment of a wireless communication system, which comprises transmitting a first bundle at a first time point, and transmitting a second bundle at a second time point behind the first time point, wherein the second time point is located in a bundle round trip time of the first bundle, and the bundle round trip time is a specific multiple of a Hybrid Automatic Repeat Request Round Trip Time.

The present invention further discloses a communication device for improving transmission time interval bundling transmission in a user equipment of a wireless communication system, which comprises a processor for executing a process, and a storage device, coupled to the processor, for storing a program for executing the process. The process comprises transmitting a first bundle at a first time point, and transmitting a second bundle at a second time point behind the first time point, wherein the second time point is located in a bundle round trip time of the first bundle, and the bundle round trip time is a specific multiple of a Hybrid Automatic Repeat Request Round Trip Time.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
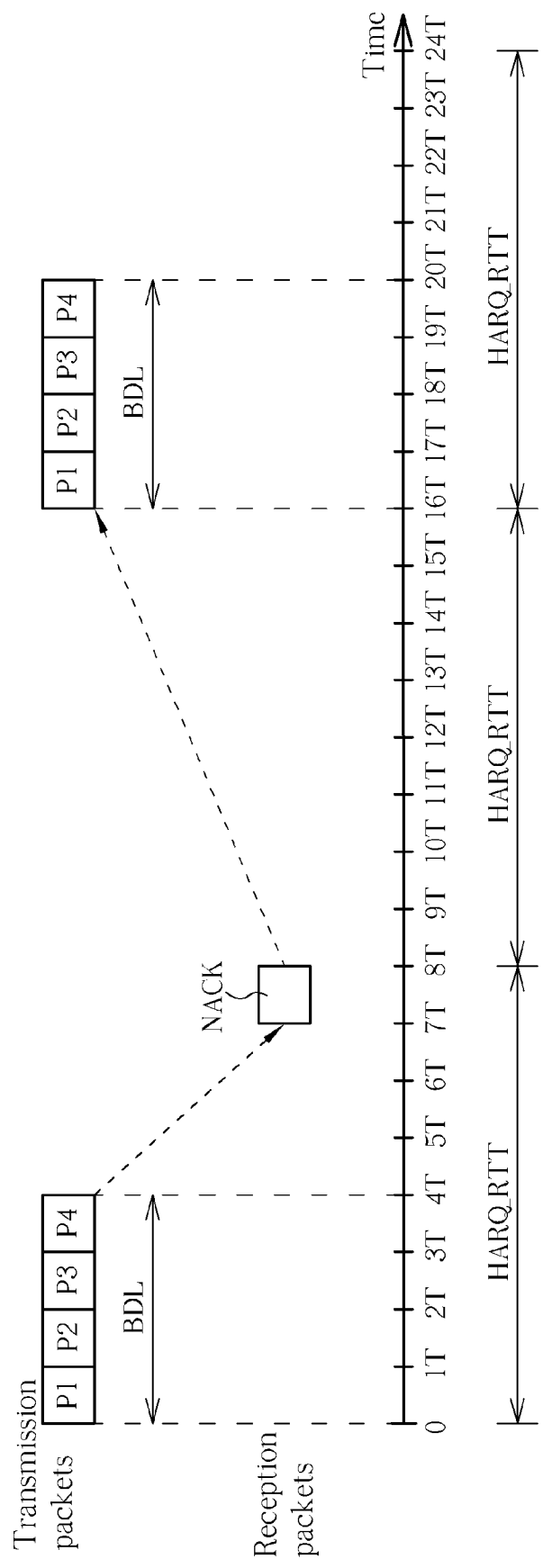
FIG. 1A, FIG. 1B and FIG. 1C are schematic diagrams of packets transmission and reception of a user equipment (UE) when performing transmission time interval bundling in the prior art.
Figure 1B:
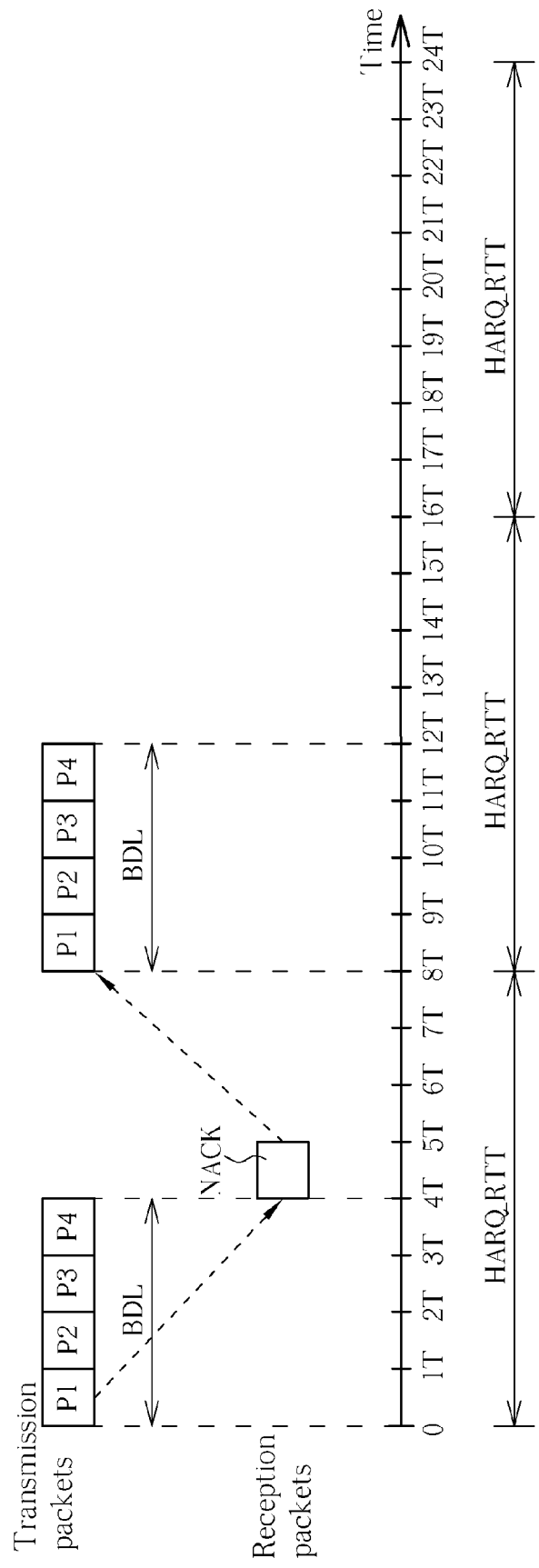
Figure 1C:
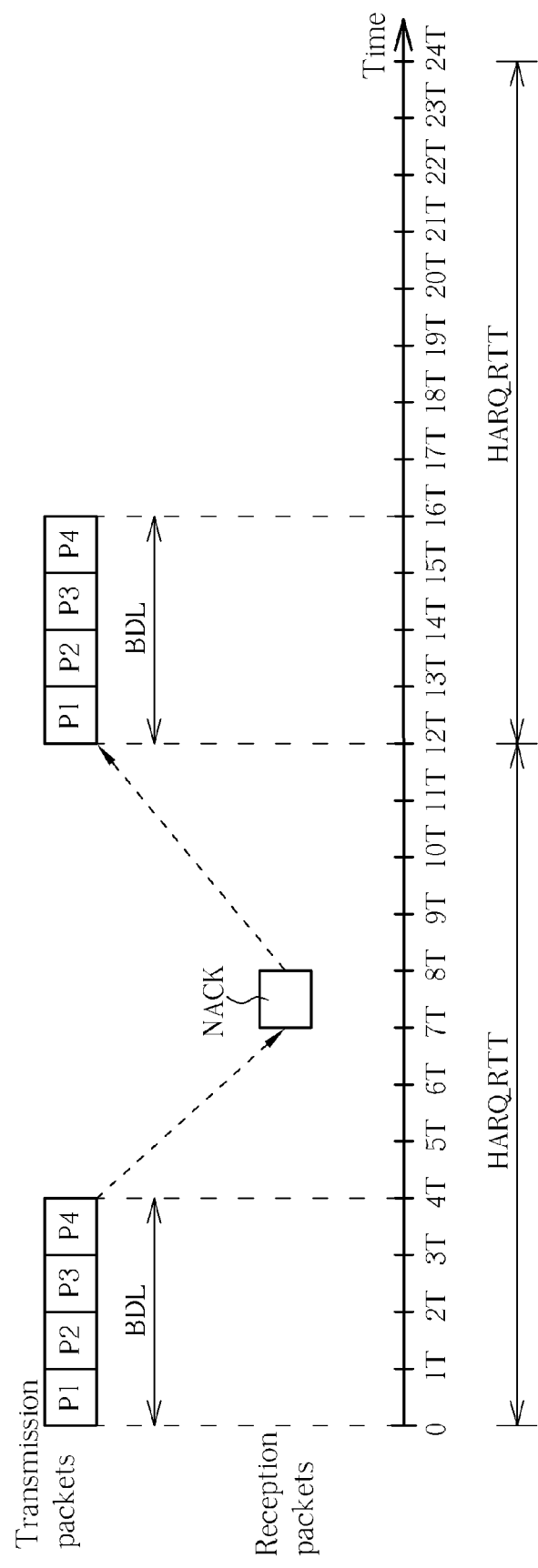
Figure 2:
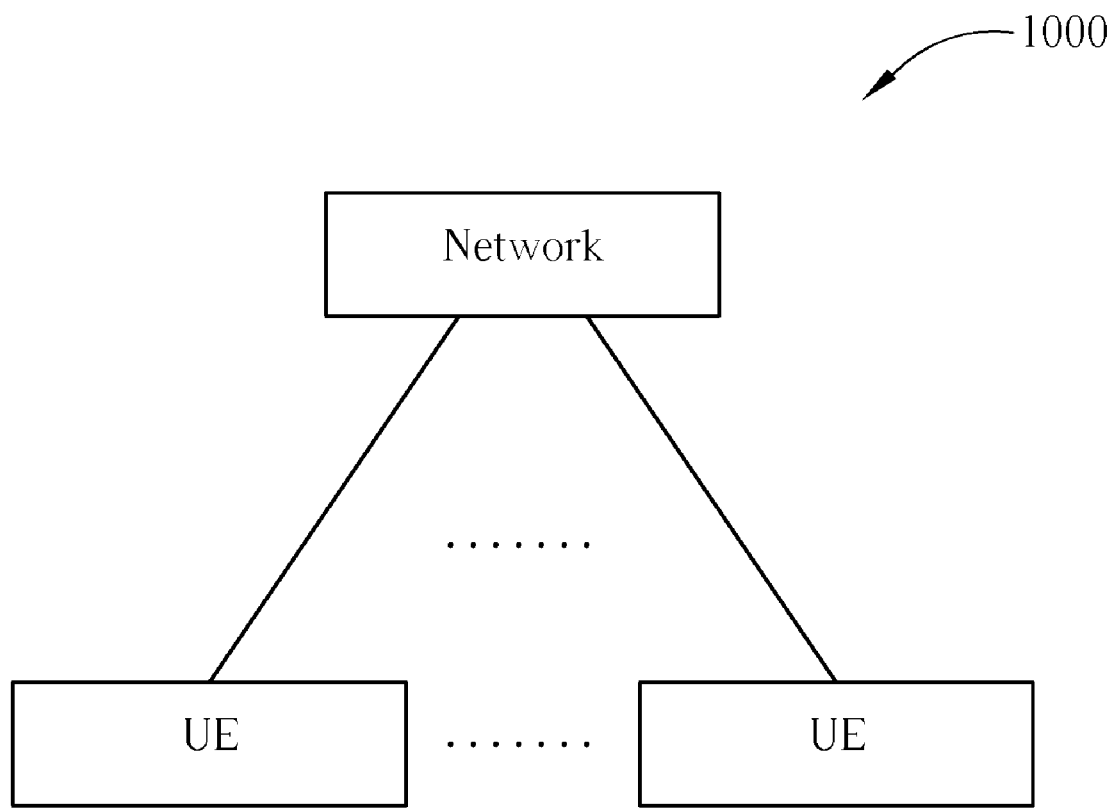
FIG. 2 is a schematic diagram of a wireless communication system.

Please refer to FIG. 2, which is a schematic diagram of a wireless communication system 1000. The wireless communication system 1000 is preferred to be a Long Term Evolution (LTE) communication system, and is briefly formed with a network terminal and a plurality of user equipments. In FIG. 1, the network terminal and the user equipments are simply utilized for illustrating the structure of the wireless communication system 1000. Practically, the network terminal may include a plurality of evolved base stations (eNBs), an evolved UMTS radio access network (EUTRAN) and so on according to actual demands, and the user equipments (UEs) can be apparatuses such as mobile phones, computer systems, etc.

Figure 3:
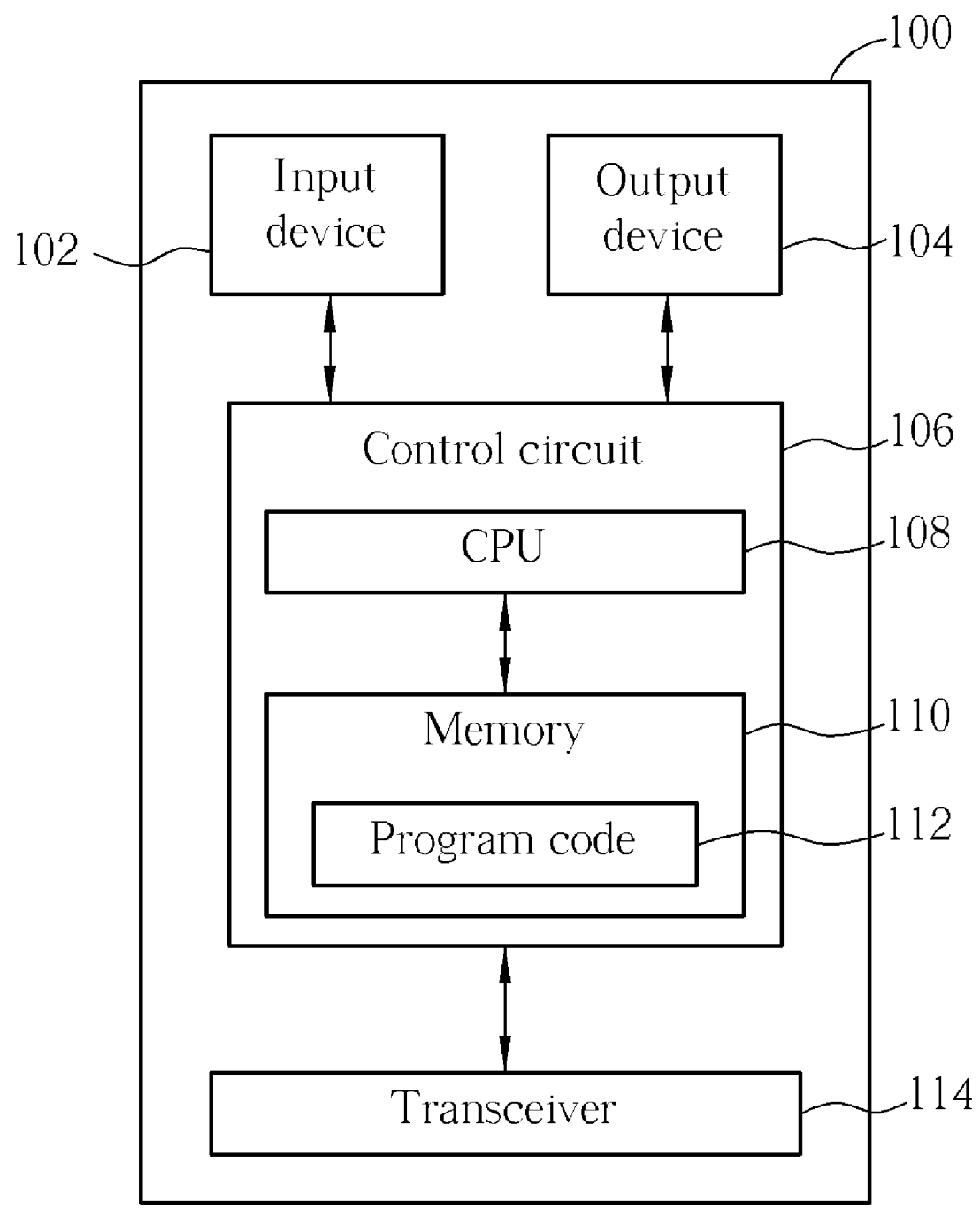
FIG. 3 is a functional block diagram of a wireless communication device.

Please refer to FIG. 3, which is a functional block diagram of a communication device 100. The communication device 100 can be utilized for realizing the UEs in FIG. 2. For the sake of brevity, FIG. 3 only shows an input device 102, an output device 104, a control circuit 106, a central processing unit (CPU) 108, a memory 110, a program code 112, and a transceiver 114 of the communication device 100. In the communication device 100, the control circuit 106 executes the program code 112 in the memory 110 through the CPU 108, thereby controlling an operation of the communications device 100. The communication device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 4:
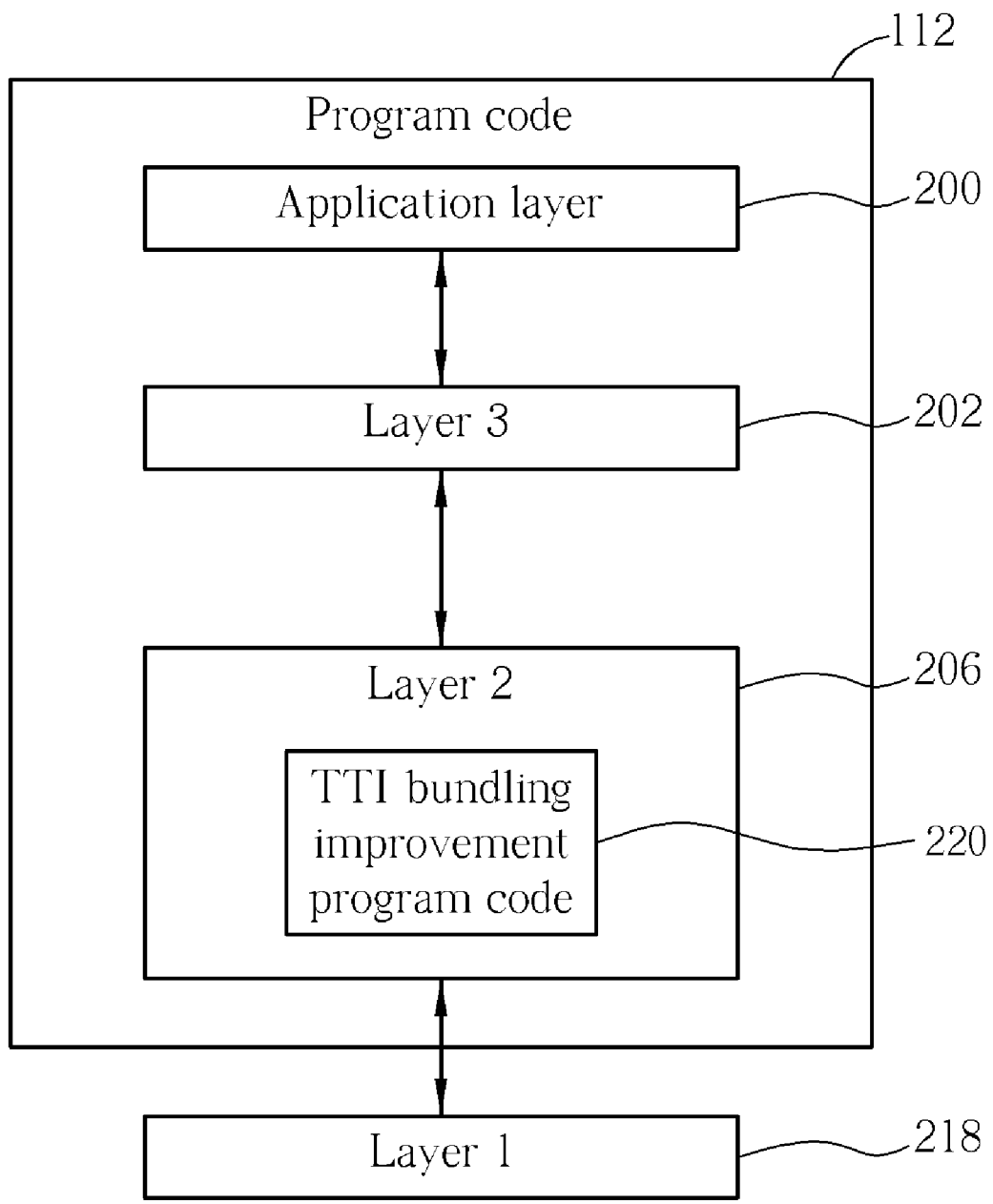
FIG. 4 is a schematic diagram of the program code shown in FIG. 3.

Please continue to refer to FIG. 4. FIG. 4 is a schematic diagram of the program code 112 shown in FIG. 3. The program code 112 includes an application layer 200, a Layer 3 202, and a Layer 2 206, and is coupled to a Layer 1 218. The Layer 3 202 performs radio resource control. The Layer 2 206 comprises an RLC layer and a MAC layer, and performs link control. The Layer 1 218 performs physical connections.

In LTE, the MAC layer of the Layer 2 206 can perform a transmission time interval (TTI) bundling function for enhancing reliability and accuracy of transmission, to improve uplink coverage. Under such circumstances, when TTI bundling is configured by UE, the embodiment of the present invention provides a TTI bundling improvement program code 220 to improve TTI bundling transmissions.

Figure 5:
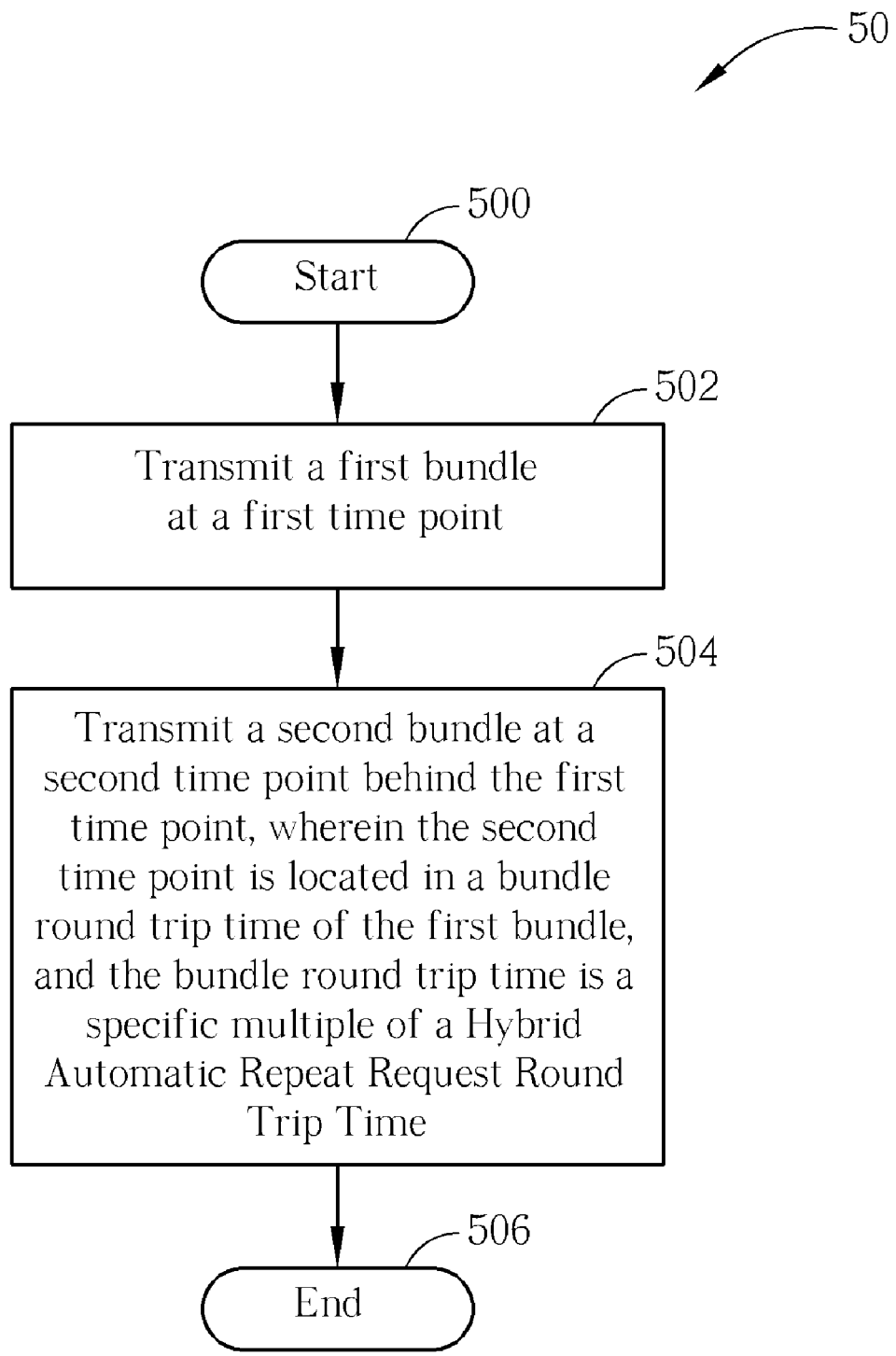
FIG. 5 is a flow chart of a process according to an embodiment of the present invention.

Please refer to FIG. 5, which is a flow chart of a process 50 according to an embodiment of the present invention. The process 50 is used for performing TTI bundling transmissions for a UE of the wireless communication system 1000, and can be compiled into the TTI bundling improvement program code 220. The process 50 includes the following steps:

Step 500: Start.

Step 502: Transmit a first bundle at a first time point.

Step 504: Transmit a second bundle at a second time point behind the first time point, wherein the second time point is located in a bundle round trip time of the first bundle, and the bundle round trip time is a specific multiple of a Hybrid Automatic Repeat Request Round Trip Time.

Step 506: End.

According to the process 50, after transmitting the first bundle, the embodiment of the present invention transmits the second bundle in a bundle round trip time of the first bundle, and the bundle round trip time is a specific multiple of the Hybrid Automatic Repeat Request Round Trip Time (HARQ RTT). In short, in the embodiment of the present invention, the UE transmits the second bundle in the specific multiple of the HARQ RTT after transmitting the first bundle. Note that, a length of the HARQ RTT is not related to a packet number of the first bundle or the second bundle, and preferably is 8 TTIs (i.e. 8 ms).

In detail, the main concept of the present invention is to treat the bundle round trip time as the specific multiple of the HARQ RTT. Note that, the length of the HARQ RTT and the operation of HARQ remain unchanged. The most important is that the embodiment of the present invention does not require to limit a target for the network to report acknowledgement signal. For example, if the bundle round trip time is twice the HARQ RTT, the second time point of transmitting the second bundle is behind the first time point for a HARQ RTT. Under such circumstances, in the embodiment of the present invention, the UE can transmit another bundle immediately at a next HARQ RTT after transmitting a bundle. Consequently, the HARQ RTT is saved and not required to be prolonged.

Figure 6:
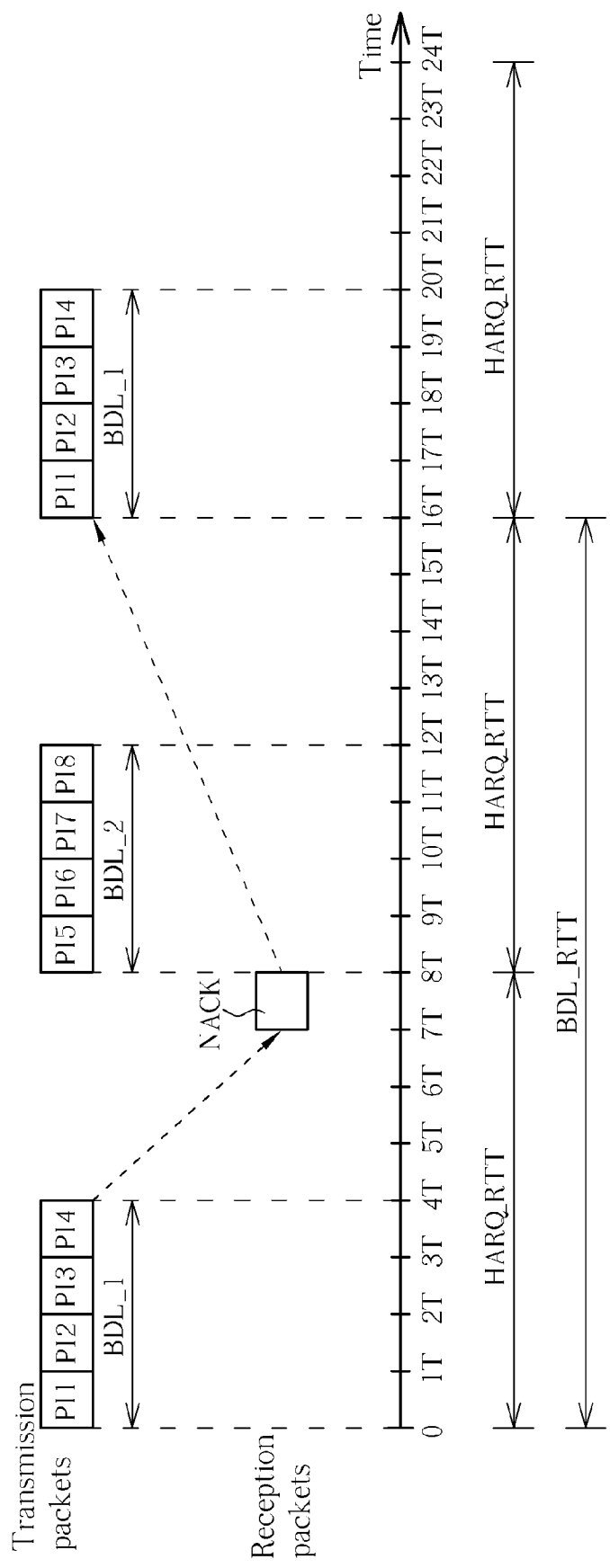
FIG. 6 and FIG. 7 are schematic diagrams of packets transmission and reception of a user equipment (UE) when performing transmission time interval bundling according to the process shown in FIG. 5.

Furthermore, please refer to FIG. 6, which illustrates packet transmission and reception of a UE according to the embodiment of the present invention. In FIG. 6, related parameters are the same as those in FIG. 1A, which is, the length of TTI is T, HARQ_RTT represents HARQ RTT with a fixed length 8T, and BDL_RTT represents the bundle round trip time. As shown in FIG. 6, the bundle round trip time BDL_RTT is twice the HARQ_RTT. Packets PI1, PI2, PI3 and PI4 are the same packet transmitted repeatedly for 4 consecutive TTIs from a UE, which means the packets PI1, PI2, PI3 and PI4 form a bundle BDL_1. Therefore, according to the embodiment of the present invention, after transmitting the bundle BDL_1, the UE will start to transmit another bundle at the next HARQ_RTT of the same bundle round trip time BDL_RTT. Therefore, at time point 8T, the UE starts to transmit a bundle BDL_2 with packets PI5, PI6, PI7 and PI8. Besides, when the UE finishes transmitting the bundle BDL_1 at time point 4T, the network end generates an acknowledgement signal (ACK/NACK) according to a decoding result of the bundle BDL_1 to indicate a reception status of the bundle BDL_1. In this case, if the bundle BDL_1 is not received successfully by the network end, the network end will report NACK. When the UE receives NACK from the network end from time point 7T to 8T, the UE starts a retransmission of the bundle BDL_1 at time point 16T. As mentioned above, after the UE finishes transmitting a bundle, the UE immediately start to transmit another bundle at the next HARQ_RTT no matter the UE needs to perform retransmission or not. Under such circumstances, radio resource is utilized effectively to prevent shortcomings of the prior art.

Note that, in FIG. 6, the UE transmits the bundle BDL_1 and BDL_2 from time point 0T to 4T and 8T to 12T, and retransmits the bundle BDL_1 from time point 16T to 20T. The bundle round trip time BDL_RTT is a duration from transmission to retransmission of the bundle BDL_1. From 0T to 16T, two HARQ_RTTs go through, while the embodiment of the present invention transmits the bundle BDL_2 in the second HARQ RTT (8T~16T); that is why the bundle round trip time is treated as twice the HARQ RTT.

Figure 7:
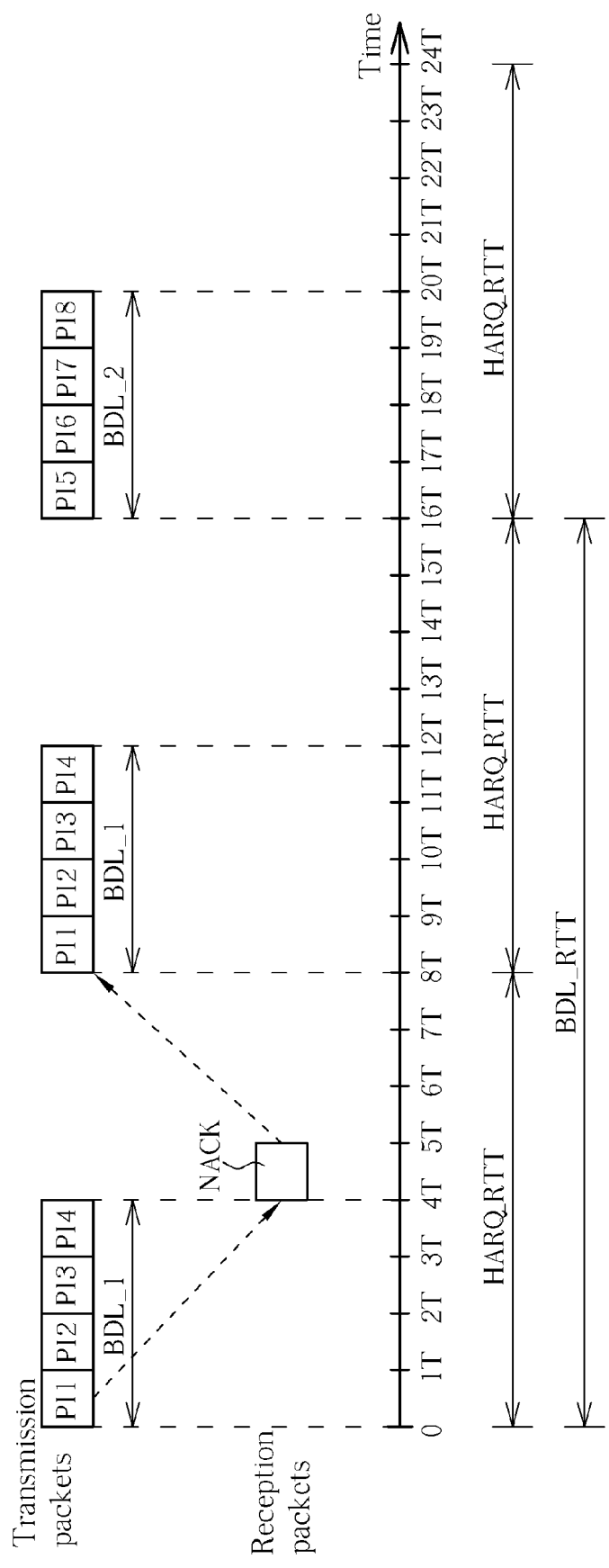

On the other hand, the response target is not limited to the first packet or the last packet of the bundle BDL_1. For example, in FIG. 6, the network end generates the acknowledgement signal according to the decoding result of all packets of the bundle BDL_1. Since the packets PI1 to PI4 are all the same, the network end determines whether the bundle BDL_1 is received successfully after receiving the packet PI4, and generates the acknowledgement signal accordingly. In other embodiments, if the packets of the bundle BDL_1 are not exactly the same and with some differences, the network end may determine that the bundle BDL_1 will be erroneous when receiving the packet PI1. Under such circumstances, as shown in FIG. 7, the embodiment of the present invention starts to retransmit the bundle BDL_1 at the second hybrid automatic repeat request round trip time (8T~16T).

To sum up, in the embodiment of the present invention, the bundle round trip time is a multiple of the HARQ RTT, and the UE can immediately transmit another bundle at the next HARQ RTT after transmitting a bundle, to prevent waste of the HARQ RTT and prolonging the HARQ RTT. Therefore, the embodiment of the present invention can enhance the efficiency of TTI bundling and prevent waste of radio resource.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving transmission time interval bundling transmission in a user equipment of a wireless communication system, the method comprising:
    transmitting a first bundle at a first time point; and
    transmitting a second bundle at a second time point behind the first time point, wherein the second time point is located in a bundle round trip time of the first bundle, and the bundle round trip time is a specific multiple of a Hybrid Automatic Repeat Request Round Trip Time (HARQ RTT).

2. The method of claim 1, wherein the first bundle and the second bundle are same.

3. The method of claim 1, wherein the first bundle and the second bundle are different.

4. The method of claim 1, wherein a length of the HARQ RTT is not related to a packet number of the first bundle and the second bundle.

5. The method of claim 1, wherein the length of the HARQ RTT is 8 transmission time intervals.

6. The method of claim 1, wherein the specific multiple is 2.

7. The method of claim 6, wherein the second time point is behind the first time point for the HARQ RTT.

8. The method of claim 1, wherein the wireless communication system is a Long-Term Evolution communication system.

9. A communication device for improving transmission time interval bundling transmission in a user equipment of a wireless communication system, the communication device comprising:
    a processor for executing a process; and
    a storage device, coupled to the processor, for storing a program for executing the process, wherein the process comprises:
        transmitting a first bundle at a first time point; and
        transmitting a second bundle at a second time point behind the first time point, wherein the second time point is located in a bundle round trip time of the first bundle, and the bundle round trip time is a specific multiple of a Hybrid Automatic Repeat Request Round Trip Time (HARQ RTT).

10. The communication device of claim 9, wherein the first bundle and the second bundle are same.

11. The communication device of claim 9, wherein the first bundle and the second bundle are different.

12. The communication device of claim 9, wherein a length of the HARQ RTT is not related to a packet number of the first bundle and the second bundle.

13. The communication device of claim 9, wherein the length of the HARQ RTT is 8 transmission time intervals.

14. The communication device of claim 9, wherein the specific multiple is 2.

15. The communication device of claim 14, wherein the second time point is behind the first time point for the HARQ RTT.

16. The communication device of claim 9, wherein the wireless communication system is a Long-Term Evolution communication system.

* * * * *